J. M. JOSIAS.
Sprinkler.
No. 204,333.  Patented May 28, 1878.
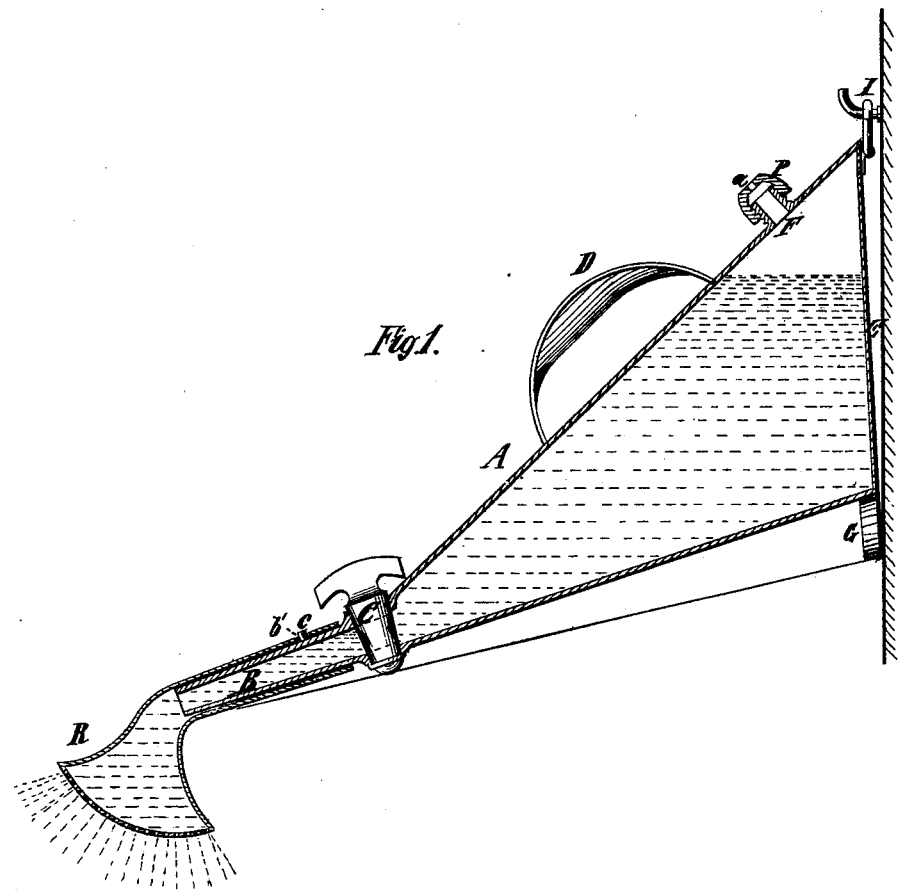
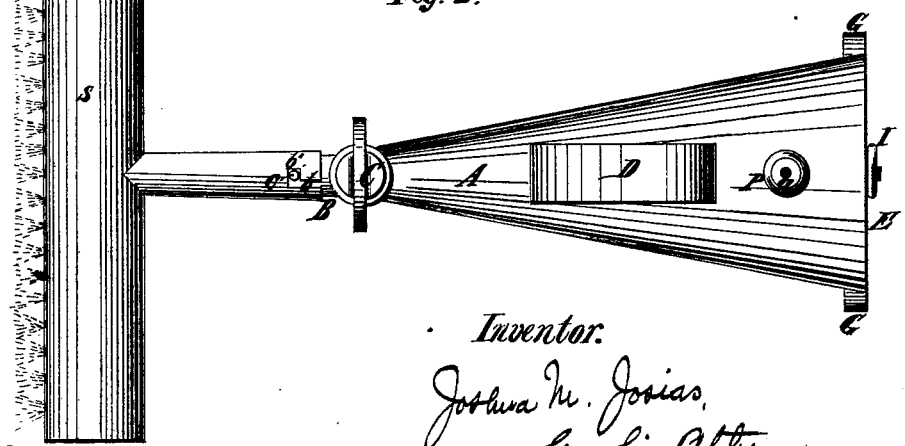

UNITED STATES PATENT OFFICE.

JOSHUA M. JOSIAS, OF NEW YORK, N. Y.

IMPROVEMENT IN SPRINKLERS.

Specification forming part of Letters Patent No. 204,333, dated May 28, 1878; application filed September 28, 1877.

*To all whom it may concern:*

Be it known that I, JOSHUA M. JOSIAS, of the city, county, and State of New York, have invented a certain new and useful Instrument for Distributing Liquids, of which the following is a description:

The instrument which I have invented is of longitudinally-tapering form, and is provided near the smaller end with a faucet or cock to control the distribution of liquid from it.

It is intended to be inclined so that its contents will always flow from the delivery end without tilting it, and to insure this its handle is arranged near the larger end, and its supporting-legs and a hanger, by which it is to be suspended for some purposes, are arranged so as to elevate the larger end.

In the accompanying drawing, Figure 1 is a central longitudinal section of an instrument embodying my invention, and Fig. 2 is a plan or top view of the same.

Similar letters of reference designate corresponding parts in both figures.

The body A of the instrument is of longitudinally-tapering form, and may be made of any suitable material, such as sheet metal.

Its spout B is preferably provided with some throttling device, such as a cock or faucet, C, and is adapted to receive various appendages for distributing the contents of the instrument, as may be desired.

Provision may be afforded for filling it by a cap, P, screwed onto a filler-mouth, F, and furnished with an opening, $a$, through which air may enter to balance the atmospheric pressure, and permit the escape of liquid from it.

It will be seen that I arrange the handle D of this instrument nearer the larger end, and thus I prefer to arrange it, because then the instrument is caused to assume an inclined position, so that in using it its contents are always ready to flow out, and nothing needs to be done but to open the throttling device (the cock or faucet, or whatever else it may be,) to regulate the flow.

This instrument is very useful as a watering-pot for flowers and other plants, and also for watering or sprinkling walks or floors.

Its incline, by avoiding all necessity for tilting it to cause its contents to flow out, renders it especially convenient for a lady or child, as there is no straining of the wrist entailed in its use.

It will also be evident that with this instrument liquid may be more easily directed upon a particular flower or plant than with the watering-pot requiring to be tilted almost upside down when the liquid in it becomes low. Then again, being very long or extending horizontally rather than vertically, and being closed, the liquid escaping from it is not likely to soil the clothes. For this reason, among others, it is admirably adapted for distributing poison on plants infested with insects—for instance, for administering Paris-green to potato-bugs.

When used as a watering-pot its nozzle alone may serve to distribute the liquid from it.

If desirable, however, an ordinary rose-head, R, may be employed with it, as shown in Fig. 1, and this will be advantageous for sprinkling a plant or the like; but if it is desirable to sprinkle a path, walk, floor, or any articles of clothing—for instance, before ironing them—a long barrel or cylinder, S, may advantageously be applied to the nozzle, as shown in Fig. 2. These appendages may be fastened in various ways.

I have shown their sockets as provided with L-shaped slots $b\ b'$, parts of which, $b$, extend longitudinally inward from their open ends, and the other parts, $b'$, of which extend circumferentially or transversely through them. Upon slipping the longitudinal parts $b$ of these slots over a projection, $c$, on the nozzle B, and then bringing the circumferential or transverse portion $b'$ over said projection, as may be understood by reference to Fig. 2, the parts will be fastened in place.

It will be seen that the legs G for supporting this instrument are so arranged as to keep it in an inclined position. By this means it may always be drained after use, and, being thus in a great measure precluded from rusting, it will be rendered very durable.

An important feature of the instrument thus far overlooked is its back E. This is so arranged that by bearing against a support when the instrument is hung from a ring, I, or other suspensory device provided for the purpose, the body of the instrument will still assume an inclined position. This feature enables the device to be used as a showering device in connection with a bath, and renders it especially valuable for the use of barbers in shampooing, and is, indeed, remarkably adapted to the wants of barbers in country places where there is no natural head or flow of water. Its legs G also enable it to be placed on a shelf for these purposes.

What I claim as my invention, and desire to secure by Letters Patent, is—

1. An instrument for conveying and distributing liquids, capable of being carried in the hand, having a horizontally-extending and longitudinally-tapering body closed at the larger end, substantially as specified.

2. The combination, with an instrument for conveying and distributing liquids, capable of being carried about in the hand, having a longitudinally-tapering and horizontally-extending body closed at the larger end, of a cock or faucet controlling the escape of liquid at the smaller end, substantially as specified.

3. An instrument for conveying and distributing liquid, having a longitudinally-tapering body closed at the larger end, and provided with a suspending handle on its tapering side, so that when suspended by such handle, it will assume an approximately horizontal position, substantially as specified.

4. The combination, with an instrument for conveying and distributing liquids, capable of being carried about in the hand, having a longitudinally-tapering and horizontally-extending body closed at the larger end, of legs affixed rigidly thereto, and adapted to support said instrument in its proper horizontal position, substantially as specified.

5. The combination, with an instrument for distributing liquids, having a longitudinally-tapering body, of a back closing the larger end, and provided with a suspensory device, so that said instrument may be hung against a wall in an approximately horizontal position, substantially as specified.

6. The combination of the instrument A, its cock C, nozzle B, and cylindrical sprinkler S, substantially as and for the purpose specified.

JOSHUA M. JOSIAS.

Witnesses:
CHANDLER HALL,
EDWIN H. BROWN.